Patented Dec. 15, 1942

2,304,836

UNITED STATES PATENT OFFICE 2,304,836

METHOD FOR THE PREPARATION OF HYDROXY STEROID DERIVATIVES

Russell Earl Marker, State College, Pa., assignor to Parke, Davis & Company, Detroit, Mich., a corporation of Michigan No Drawing. Application August 2, 1940,
Serial No. 350,067

17 Claims. (Cl. 260—397.4)

This invention relates to new and useful methods for the preparation of hydroxy steroid derivatives.

An object of this invention, therefore, is the preparation of hydroxy steroidal derivatives by a novel and economical procedure.

Another object of this invention is the preparation of 17-hydroxyandrostane derivatives (II) and 21-hydroxy-20-keto-pregnane derivatives (III) from 20-keto-pregnane compounds, (I), i. e., steroids having attached to $C_{17}$ the radical

The 17-hydroxy androstane derivatives and 21-hydroxy-20-keto-pregnane compounds of this invention are useful as hormones, or as intermediates for the preparation of hormones.

Further objects of this invention will appear on perusal of this specification.

The transformations may be illustrated as follows:

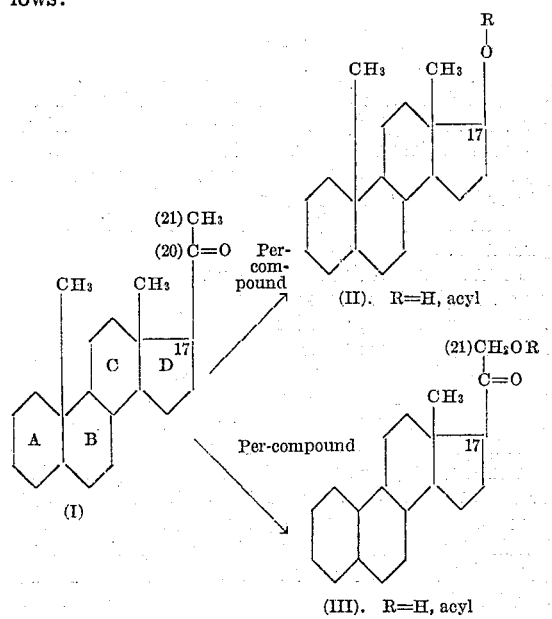

Hitherto, 17-oxygenated-androstane derivatives have been obtained by the oxidation, in one or several steps, of sterols or bile acids. However, the yields of androstane compounds have always been very small, of the order of a few percent, so that these processes have been extraordinarily wasteful and expensive. While methods have been suggested for the preparation of 17-hydroxy-androstane derivatives from 20-keto-pregnane compounds, these methods have never found commercial application, both because of the numerous steps involved—and consequently low yields—and because of the inavailability of the 20-keto-pregnanes required. Indeed, in the past the 20-keto-pregnane compounds have been less accessible, and more expensive, than the 17-hydroxy-androstane derivatives; so that it has been necessary to devise methods for the synthesis of the former from 17-keto-androstane derivatives.

The second of the two difficulties attendant to the preparation of 17-oxygenated androstane derivatives has been recently overcome by my development of a method for obtaining pregnane compounds from sapogenins. (Marker and co-workers, J. A. M. Chem. Soc. 62, 518 (1940) and later papers).

Again, the 21-hydroxy-20-ketopregnane derivatives, useful as cortical hormones, or intermediates therefor, have hitherto been extremely costly, and difficult to obtain, for in the past they have been prepared from the 17-keto-androstanes by methods involving much labor and numerous steps—and with resultingly poor yields.

Now I have discovered a new, simple, and inexpensive method for the preparation of 17-hydroxy-androstane derivatives and 21-hydroxy-20-keto-pregnane derivatives from the now readily available 20-keto-pregnane compounds. This method involves only one step, and the yields are surpisingly high, amounting to about 30–45 percent of each of the two types of products formed. The remainder is unreacted starting material which can readily be recovered and reprocessed.

A unique feature of my invention is the oxidation of a 20-keto-pregnane derivative (I), having attached to C-17 the radical

with hydrogen peroxide, or a substance derived therefrom. For conciseness, and in harmony with the most favored scientific terminology, these compounds will be called per-compounds, A distinction [C. F. Price, Per-acids and Their Salts, p. 1 ff., Longmans-Green, (1911)] is to be made between these substances, which, for brevity, are properly called per-compounds, and another type of compound, exemplified by periodates, permanganates, etc. which are not per-compounds. While the true per-compounds, to which this invention relates, are derived from hydrogen peroxide and are supposed to contain at least two oxygen atoms linked together (as —O—O—, or =O—O, the exact nature of the linkage not being definitely known), the false "per-compounds," of which "lead peroxide" is another example, contain no oxygen-oxygen linkages, do not liberate hydrogen peroxide when treated with acids, and in reality represent higher valency states of the atom bonded to the oxygen. This may be made clearer by the following tabulation:

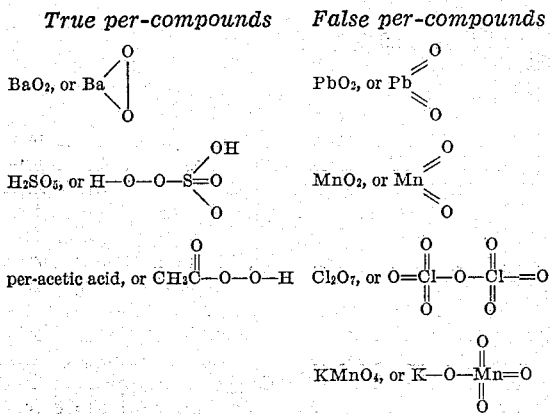

Where in the appended claims the term "per-compound" is used it refers to the "true per-pound" as above defined.

The action of the per-compound on a 20-ketopregnane compound is to oxidize the latter in one step, as shown in the transformation I→II and III, shown above, thus forming a mixture of 17-hydroxy-androstane derivatives and 21-hydroxy-20-keto-pregnane derivatives. In the compounds II, and III, R is a radical selected from the group of hydrogen and acid radicals, such as

—SO₃H, and the like.

It is known [Baeyer and Villger, Ber. 33, 124 (1900)] that Caro's acid (H₂SO₅) oxidizes cyclic ketones with formation of lactones. For example, menthone (IV)

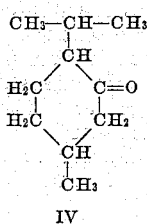

gives the lactone (V)

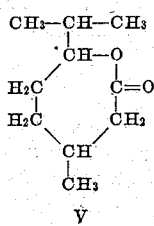

and other simple cyclic ketones such as suberone and camphor behave similarly, giving the corresponding lactones. In most cases other products such as peroxides are also formed, and the reaction is not clearcut.

On the other hand, it is also known [Baeyer, loc. cit.] that aliphatic ketones, such as acetone, diethyl ketone and the like, react with Caro's acid to give peroxides. This is illustrated below, in the case of acetone.

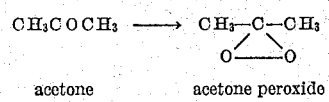

acetone      acetone peroxide

The peroxides thus formed are unstable, explosive, and dangerous to handle. Most of them readily polymerize to dimers, trimers, etc.

In no instance has a mixed, i. e. a cyclic-aliphatic ketone, been successfully oxidized with Caro's acid, and there was no data at hand which could indicate the course of the reaction, if any, nor had the oxidation of any kind of ketones according to the method of Baeyer, found any practical application.

I have found that steroidal ketones having an acetyl

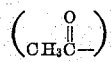

group attached to C—17 of the cyclopentanopolyhydrophenanthrene nucleus react smoothly, and in high yields, with per-compounds to give steroidal compounds having attached to C₁₇ a member of the group —OR and

R being selected from the class consisting of hydrogen, and organic and inorganic acid radicals, viz.

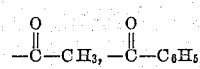

—SO₃H, and the like. The course of this oxidation is surprising, for there are no indications from the literature that hydroxy compounds could be formed in this manner. It is surprising, also, that the reaction proceeds so satisfactorily, and in high yields, without formation of by-products, such as peroxides or acids.

I have studied the application of this new mode of oxidation to numerous types of 20-keto-pregnane compounds, and I have discovered that the method possesses wide applicability.

Thus my invention may be practiced upon 20-keto-pregnane compounds unsubstituted in the nucleus, or bearing in any of the rings A, B, C, substituents selected from the group consisting of hydroxyl, and groups capable of hydrolysis to give hydroxyl, such as halo- or ester groups. The fact that nuclear hydroxyl groups are not oxidized to ketone groups is an especially surprising feature of my invention. Indeed, I may conduct the oxidations in a solvent such as alcohol, so inert are hydroxyl groups to oxidation in my process.

Again, my invention may be practiced on 20-keto-pregnane compounds having, in the nucleus (in rings A, B, C,) an α,β-unsaturated ketone system, as in progesterone (VI), which, on treatment with Caro's acid in acetic acid according to one embodiment of my process, yields testosterone acetate (VII) and 21-hydroxyprogesterone acetate (VIII).

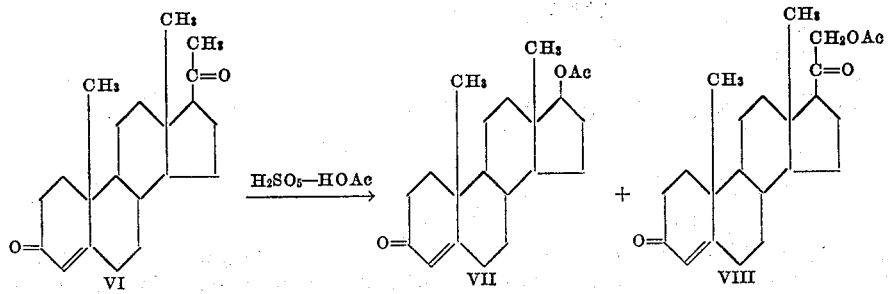

Here, too, it is remarkable that the sensitive α-β-unsaturated ketone system in ring A is unaffected.

resulting α-halo-ketones, having a $$-\overset{O}{\underset{\|}{C}}-CH_3$$

group at C—17, are readily oxidized in accordance with my invention, without appreciable nuclear transformation. This may be illustrated for the case of 4-bromo-pregnanedione-3,20 (XI).

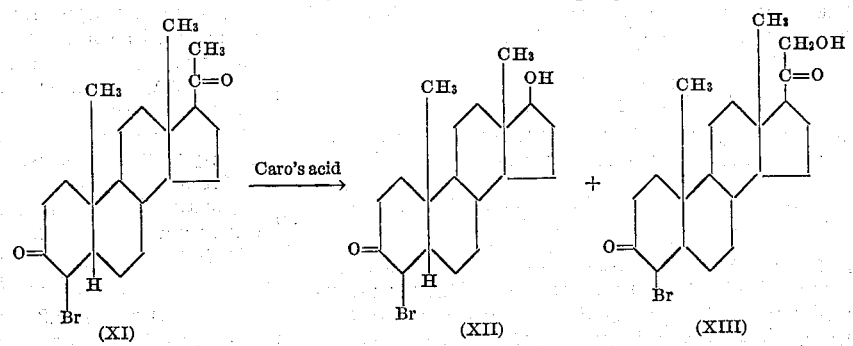

However, I find that in the reaction of per-compounds with 20-keto-pregnane compounds containing isolated, (i. e., unconjugated,) ketone groups or double bonds, as in pregnanedione (IX)

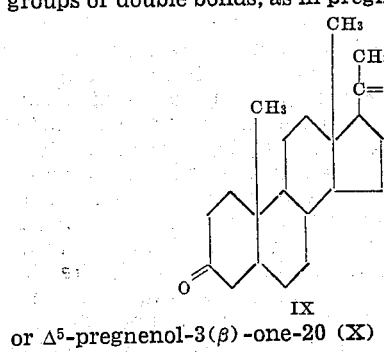

or Δ⁵-pregnenol-3(β)-one-20 (X)

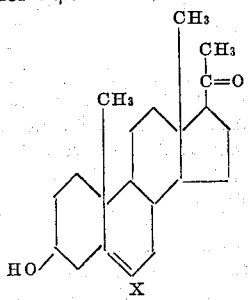

the nucleus is often attacked; so that, in general, I find it advisable to protect, or modify, these groupings prior to oxidation if nuclear transformations are to be controlled. In a preferred form of my invention nuclear ketone groupings are advantageously protected indirectly, by bromination at a carbon atom adjacent to the nuclear ketone group. If the ketone group is at C—3 the halogen enters at C—4, or C—2, depending on whether the configuration at C—5 is of the regular, or of the allo type. The A further feature of my invention is the treatment of the mixture thus formed with a reagent capable of removing hydrohalic acid from the halogenated steroidal ketone mixture to form a mixture of testosterone, 21-hydroxy-progesterone, and some progesterone.

According to another embodiment of my invention nuclear double bonds are protected prior to oxidation with a per-compound by addition of a reagent such as halogen or hydrohalic acid. After oxidation the products, 17-hydroxy-androstane derivatives and 21-hydroxy-20-keto-pregnane derivatives, may be treated with a reagent capable of removing the halogen or hydrohalic acid to reestablish the double bond.

Since the products obtained on oxidation of a 20-keto-pregnane compound with a per-compound are a mixture of 17-hydroxy-androstane derivatives and 21-hydroxy-20-keto-pregnane derivatives, my invention also comprehends methods for the separation of this mixture. I have found that on heating with mild alkali for a short time, as for example, on refluxing for a half hour with 1% methanolic potassium hydroxide, 21 - hydroxy - 20 - keto - pregnane compounds are smoothly transformed into the corresponding etio-acids, while 17-hydroxy-androstane derivatives esterified at the C—17 OH are merely hydrolyzed to the parent 17-hydroxy compound. Under these conditions a nuclear α-β-unsaturated ketone group, such as occurs in testosterone, 21-hydroxy-progesterone, and progesterone, remains practically unaffected. This result is most surprising for the instability of these α-β-unsaturated ketones to alkali has been repeatedly asserted in the literature [C. F., Fieser, Chemistry of Natural Products Related to Phenanthrene, 2nd ed., p. 237 (Reinhold Pub. Co., (1936))]. The reaction may be illustrated in the case of the transformation of 21-hydroxyprogesterone (XIV) to 3-keto-Δ⁴-etio-cholenic acid (XV).

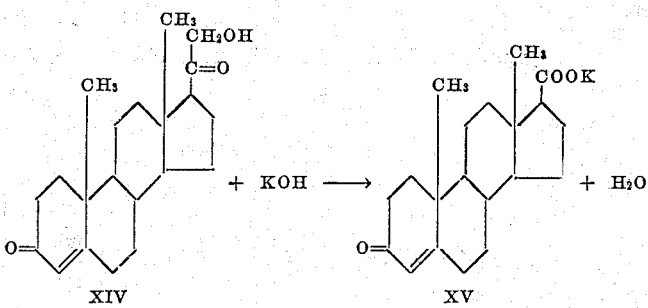

This reaction may be utilized as a mode of separation of the mixture of products obtained on oxidation according to my new process. The mixture may be subjected to mild saponification first, as with potassium bicarbonate, to hydrolyze the oxidized products to the parent hydroxy compounds (17—OH and

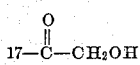

compounds), and these separated from any unreacted starting material (which contains the

group at C—17) by means of the half-succinate esters, the half-phthalate esters, or other methods commonly employed to separate hydroxylic from non-hydroxylic substances. Then the mixture of oxidized products is treated with alkali as described above, and the reaction mixture separated into the water-insoluble, organic-solvent-soluble 17-hydroxy-androstane compound, and the water-soluble, organic-solvent-insoluble alkali metal salt of the etio-cholanic acid compound.

My invention may be further illustrated by the following examples.

In some of these examples the dry persulfate mixture of von Baeyer (loc. cit.) is used. This is prepared as follows:

A mixture of 100 g. of potassium persulfate and 110 g. of concentrated sulfuric acid is stirred in a mortar. After ten minutes, 30 g. of dry, powdered potassium sulfate is ground into the mixture until a practically dry powder results. This is von Baeyer's dry persulfate mixture. It is stable and may be stored for considerable periods of time, if it is protected from air, moisture, and light by storing it in a tightly stoppered brown glass bottle.

*Example 1*

A mixture of 5 grams of allo-pregnanone-20, 500 cc. of 90% acetic acid, 5 cc. of concentrated sulfuric acid and 25 grams of potassium persulfate is refluxed for 4 hours and then cooled and diluted with water and extracted with ether. The acids formed in the reaction are removed from the ether by washing the latter with sodium carbonate solution and then with water. The ether is evaporated and the residue is hydrolyzed with boiling ethanolic potassium hydroxide. To this solution an excess of water is added and the mixture extracted with ether. The etheral solution is evaporated to dryness and the carbinols separated in the known manner by means of their half-succinates. This gives a mixture of epimeric carbinols melting over a range of 110–142° C. which is not readily separated. Yield is about 40%.

The mixture of epimeric androstanol-17's described above may readily be oxidized in the known manner with chromic anhydride and acetic acid to give androstanone-17 of melting point 122° C.

The water layer from the alkaline hydrolysis described in the first paragraph is acidified and the precipitated acid taken up with ether. After washing with water the ether is evaporated and the residue recrystallized from ethyl acetate, giving white crystals of melting point 228–230° C. This product is etio-allo-cholanic acid.

Treatment of this acid with diazomethane gives a methyl ester which may be crystallized from dilute acetone as white crystals of melting point 141–143° C.

*Example 2*

A mixture of 2.3 grams of allo-pregnanol-3 (β)-one-20 acetate, 250 cc. of 90% acetic acid, 2.5 cc. conc. sulfuric acid and 10 grams of potassium persulfate is refluxed for 4 hours. The mixture is cooled, diluted with water, and extracted with ether. The ethereal layer is washed with sodium carbonate solution and with water and evaporated to leave a syrupy residue. This residue is refluxed for a half hour with an excess of 10% ethanolic potassium hydroxide solution and then diluted with water and extracted with ether. The alkaline layer is set aside to be worked up for the acid fraction. The ethereal layer is evaporated to dryness to leave a syrupy residue from which the ketones are removed in the known manner by treatment with Girard's reagent in alcohol. The non-ketonic fraction thus obtained is crystallized from dilute ethanol and dilute acetone to give a crystalline substance melting at 170–185° which apparently is a mixture of epimeric, (at 17) androstanediols. The mixture is then separated by acetylating it and passing a solution of the mixture of androstanediol diacetates in benzene-petroleum ether through a column of activated alumina. The purified androstanediol diacetate thus obtained may be hydrolyzed to the parent androstanediol.

The mixture of epimeric androstanediols may be oxidized in the known manner with acetic acid and chromic anhydride to give pure androstanedione. For this purpose the total product obtained as described above is dissolved in 25 cc. of acetic acid and 1 gram of chromic anhydride, in 5 cc. of 80% acetic acid added. After standing for 1 hour at 25° water is added, and the precipitated solid washed, extracted with ether and the acid removed from the ethereal layer by washing with sodium carbonate solution and with water. The ethereal layer is evaporated on a steam bath and the residue crystallized from ether-pentane and from dilute acetone to give pure androstanedione of melting point 128–130°

C. This gives no depression in melting point when mixed with authentic androstanedione of melting point of 130° C.

The aqueous layer from the alkaline hydrolysis is acidified and the precipitated acid dissolved in ether. After washing with water the ether is evaporated and the residue crystallized from dilute methanol to give 3($\beta$)-hydroxy-etio-allo-cholanic acid of melting point 249–252° C.

*Example 3*

To a solution of 10 grams of allo-pregnanone-20 in 1 liter of acetic acid at 25° is added a mixture of von Baeyer's persulfate reagent made from 30 grams of potassium persulfate, 33 grams of concentrated sulfuric acid, and 90 grams of potassium sulfate. It is allowed to stand with occasional shaking for 7 days at 25°. At the end of this time a solution of 35 grams of potassium hydroxide in 35 cc. of water is added and the inorganic salts filtered and washed well with acetic acid. The filtrate is evaporated in vacuo and the residue dissolved in ether, washed well with sodium carbonate solution and with water. The ether is evaporated and the residue crystallized from a mixture of acetone and methanol. Thus there is obtained 3.4 grams of a product melting at 197–200° C. This is allo-pregnanol-21-one-20 acetate.

When treated with semicarbazide acetate in methanol in the known manner it forms a product which may be crystallized from dilute alcohol to give a semicarbazone of melting point 242–244° with decomposition.

A solution of 300 mg. of allo-pregnanol-21-one-20 acetate in 30 cc. of boiling methanol is combined with 5 cc. of a 10% solution of potassium bicarbonate. After refluxing for 90 minutes the mixture is distilled in vacuo to a volume of about 20 cc. Then the mixture is extracted with ether and washed well with water. The ether layer is evaporated and the residue crystallized from methanol, in which it is rather soluble, to give allo-pregnanol-21-one-20 of melting point 115–117° C.

A mixture of 50 mg. of allo-pregnanol-21-one-20, 1 cc. of acetic anhydride, and 2 cc. of pyridine is allowed to stand overnight at room temperature. The mixture is poured into water and the precipiate collected and crystallized from methanol-acetone to give allo-pregnanol-21-one-20 acetate of melting point 197–199° C. identical with that described above.

All of the ketols of this invention are readily oxidized to the corresponding etio-acids. Thus a solution of 100 mg. of allo-pregnanol-21-one-20 in 10 cc. acetic acid may be treated with a solution of 200 mg. of chromic anhydride in 10 cc. of 90% acetic acid at room temperature. The solution is allowed to stand for 45 minutes, then water is added and the organic products extracted with ether. The ethereal layer is freed of acetic acid by washing with water and then the organic acid is removed from the ether layer by extraction with dilute sodium hydroxide solution. The alkaline extract is acidified and extracted with ether. After removal of the ether on the steam bath the residue is crystallized from ethyl acetate to give etio-allo-cholanic acid of melting point 228–230° C. identical with an authentic sample.

With diazomethane it forms an ester melting at 140–141° C. which gives no depression in melting point when mixed with the methyl ester of etio-allo-cholanic acid.

The mother liquor from the crystallization of allo-pregnanol-21-one-20 acetate is boiled for a half hour with an excess of alcoholic potassium hydroxide, and the organic fraction isolated by extraction with ether. After evaporating the ethereal extract to dryness, the residue is dried by distilling 50 cc. of benzene from it. To this dry residue is added 5 grams of succinic anhydride in 10 cc. pyridine and the mixture heated for 2 hours on a steam bath. Then ether is added and the pyridine removed by shaking the ethereal solution with dilute hydrochloric acid. Then the succinic acid esters are extracted from the ethereal solution by shaking with potassium carbonate solution. The alkaline layer is separated and acidified and the ester extracted with ether and the latter separated and evaporated on a steam bath. The residual succinic acid ester mixture is hydrolyzed by refluxing for 30 minutes with an excess of alcoholic potassium hydroxide. The mixture is diluted with water, extracted with ether, and the ethereal extract washed with water, and then the ether removed on a steam bath. The residue is crystallized from methanol, ether-pentane, and finally from ether to give androstanol-17-($\alpha$) of melting point 164–166° C. (2.1 g.). This product is identical with a known sample of androstanol-17-($\alpha$) prepared by the reduction of 3-chloroandrostanone-17 with sodium in alcohol. The non-hydroxylic fraction from the above succinic acid separation may be crystallized from methanol to give some unreacted allo-pregnanone-20 of melting point 128–131°.

*Example 4*

To a solution of 2 grams of pregnanol-3-($\alpha$)-one-20 acetate in 300 cc. of acetic acid is added 5 grams of von Baeyer's dry persulfate mixture with shaking. The mixture is maintained at 25° and daily 5 g. portions of the persulfate mixture are added with shaking. At the end of eight days an excess of 50% potassium hydroxide solution is added to neutralize the inorganic acids. The salts formed are filtered and the filtrate concentrated in vacuo. The residue is extracted with ether and washed with water and the ethereal solution evaporated. The residue is hydrolyzed by boiling with an excess of 5% methanolic potassium hydroxide solution for 1 hour. The hydrolyzed solution is diluted with water, thoroughly extracted with ether and the ethereal extract washed with water. Then the ether is evaporated on a steam bath and the residue separated into ketonic and non-ketonic fractions in the known manner with 3 grams of Girard's reagent. The ketonic fraction is quite small and yields a small amount of unreacted epipregnonolone of melting point 142–144° C. The non-ketonic fraction, constituting the bulk of the material, is crystallized from ethyl acetate and from ether to yield etio-cholanediol-3-($\alpha$)-17-($\alpha$), melting point 233–235° C. identical with an authentic sample prepared by the reduction of etiocholanolone with sodium. The yield is about 500 mg.

This etio-cholanediol-3-($\alpha$)-17-($\alpha$) when refluxed with acetic anhydride in the known manner yields an acetate of melting point 124–125° which gives no depression in melting point when mixed with an authentic sample of the diacetate of etio-cholanediol-3-($\alpha$)-17-($\alpha$).

The vigorous alkaline hydrolysis to which the total reaction product is subjected results in a rearrangement or oxidation of the α-ketol which is formed along with the etio-cholanediol. This may be shown by subjecting the original alkaline hydrolysis fraction to acidification whereupon a small amount of acid separates which may be collected with ether, the ether washed with water, evaporated and the residue crystallized to give etio-lithocholic acid, melting point 275–276° and giving no depression in melting point with an authentic sample of etio-lithocholic acid.

*Example 5*

To a solution of 1.2 grams of Δ⁵-pregnenol-3-(β)-one-20 acetate in 200 cc. of glacial acid is added 3.4 cc. of a molar solution of bromine in acetic acid. After standing a few minutes 10 g. of von Baeyer's dry persulfate mixture is added and the mixture set aside for 5 days at 25°. At the end of this time an additional 10 g. of von Baeyer's persulfate mixture is added and the reaction mixture again set aside for 2 days at 25°. Then 10 cc. of a 50% solution of potassium hydroxide is added and the inorganic salts filtered off and washed with acetic acid. The filtrate is warmed on a steam bath for one hour with 10 g. of zinc with stirring to remove the bromine which had protected the double bond during this oxidation. The acetic acid solution is decanted from the zinc and the acetic acid is removed in vacuo. The residue is diluted with ether; washed with water, the ethereal layer separated and the ether removed on the steam bath.

The residue is refluxed for 30 minutes with a 1% solution of alcoholic potassium hydroxide. The hydrolysate is diluted with water, extracted with ether, and the ethereal layer washed with water. Then the ether is evaporated and the residue treated with Girard's reagent to remove the ketones. Only a small ketonic fraction is obtained. The non-ketonic fraction, weighing 210 mg., is dissolved in a small amount of dry benzene and passed through a short tube of activated aluminum oxide. The filtrate is combined with the first eluate (using ether), and the whole evaporated to dryness. The residue is crystallized from slightly diluted methanol to yield Δ⁵-androstendiol-3,17 of melting point 176–178°. The identity of this product is shown by its oxidation (with intermediate protection of the double bond with bromine) to give Δ⁴-androstenedione-3,17 of melting point 167–170° C.

When the reaction mixture after the bromination is worked up in this manner using a strong alkaline hydrolysis, the α-ketol (Δ⁵-pregnendiol-3,21-one-20) formed along with the Δ⁵-androstenediol-3, 17 is transformed into 3-(β)-hydroxy-Δ⁵-etio-cholenic acid. The ketol may, however, be obtained by a modified isolation procedure.

For this purpose the acetic acid solution of the debrominated reaction mixture is evaporated to dryness and the residue dissolved in a small amount of benzene-petroleum ether. The solution is passed through a column of activated alumina and eluated repeatedly with petroleum ether to which increasing larger amounts of benzene are added. The fractions thus obtained are separately worked up and identical fractions combined. Thus there is obtained a nearly complete separation of the reaction product into its components, some unreacted pregnenolone acetate, androstendiol diacetate and pregnenediol-3,21-one-20.

*Example 6*

When α-halogenated ketones are oxidized according to this invention the halogenated ketone may be prepared in situ by the addition of halogen to the solution of the ketone or the previously prepared α-halogenated ketone may be purified and then used in the process.

For example, 4-bromo-pregnanedione may be prepared in situ, by adding the molar amount of bromine in acetic acid to an acetic acid solution of pregnanedione. After the mixture has stood about twenty minutes a slight excess over 1 mole of sodium acetate is added to combine with the hydrobromic acid formed in the reaction and the solution filtered from precipitated sodium bromide.

A solution of 4 grams of 4-bromo-pregnanedione-3,20 in 400 cc. of glacial acetic acid is mixed with 50 grams of von Baeyer's powdered persulfate mixture. After standing for 10 days with occasional stirring at 25° the mixture is treated with sufficient alkali to react with the inorganic acid present. The solid salts are filtered and the filtrate diluted with much water. Ether is added and the ethereal extract washed several times with water and with sodium carbonate solution and again with water. Then the solvents are removed under reduced pressure and the residue refluxed with 25 cc. of dry pyridine for 10 hours. The reaction mixture is poured into water, extracted with ether and the ethereal layer washed with dilute sulfuric acid to remove the pyridine. The ether is removed on a steam bath and the residue sublimed in a high vacuum, collecting a fraction distilling at 120–150° (bath temperature). This fraction weights about 1.72 grams.

Several methods are available for separating this distillate into its components, desoxycorticosterone acetate, progesterone, testosterone acetate.

The distillate is dissolved in 100 cc. of methanol and a solution of 1.5 g. of potassium bicarbonate in 5 cc. of water is added. After refluxing this solution for half an hour it is concentrated in vacuo to about 20 cc. The mixture is diluted with water and extracted with ether and the ethereal extract well washed with water. On evaporating the ether there remains a syrupy residue which is a mixture of progesterone, desoxycorticosterone and testosterone. The separation of this mixture may be illustrated by two procedures:

(1) The mixture is separated into hydroxylic and non-hydroxylic fractions in the known manner, for example, as follows. The residue is dissolved in 5 cc. of pyridine and 1.5 g. of succinic anhydride is added. After heating for one hour on a steam bath the mixture is dissolved in ether and the pyridine removed by extracting the ethereal solution with dilute hydrochloric acid. Then the ethereal extract is shaken with potassium carbonate solution and the latter alkaline extract set aside to be worked up for desoxycorticosterone and testosterone. The ethereal non-carbinol fraction is evaporated to dryness, leaving an oily residue. This is dissolved in 20 cc. of benzene and passed through a 2 inch column of activated alumina. It is eluted with a 50% solution of ether-benzene. The filtrate and the eluate are concentrated and crystallized from pentane and then dilute acetone to yield about 260 mg. of progesterone melting at 124–126° C. and giving no depression in melting point when mixed with an authentic sample.

The alkaline extract is acidified and extracted with ether. The ethereal extract is washed with water, evaporated to dryness and the residue refluxed with 2 cc. of acetic anhydride for 20 minutes. Then the acetic anhydride is completely removed in vacuo and the residue dissolved in benzene-petroleum ether and passed through a column of activated alumina. The column is fractionally eluted with benzene-petroleum ether and the fractions separately crystallized from benzene-petroleum ether. Thus the acetate mixture is resolved into its components, desoxycorticosterone acetate of melting point 159° C. and testosterone acetate of melting point 142° C. The yield of each of these compounds is about 300 mg.

(2) In an alternative procedure for separating the testosterone and desoxycorticosterone, the desoxycorticosterone may be transformed by refluxing the mixture for 30 minutes with 50 cc. of a 1% solution of potassium hydroxide in methanol. Under this treatment the desoxycorticosterone is practically quantitatively converted into $\Delta^4$-3-keto-etio-cholenic acid while the testosterone is practically unaffected. When the mixture after hydrolysis is dissolved in ether and diluted with water the alkaline layer can be drawn off to yield the $\Delta^4$-3-keto-etio-cholenic acid while the testosterone remains in the ether, from which it may be recovered by evaporation of the ether and crystallization of the residue from ether-pentane. As thus obtained the testosterone has a melting point of about 151–152°. The alkaline layer containing the $\Delta^4$-3-keto-etio-cholenic acid in the form of its alkaline metal salt may be acidified and extracted with ether, the ether evaporated, and the residue crystallized from ether-pentane to yield pure $\Delta^4$-3-keto-etio-cholenic acid, M. P. 249–253° C.

*Example 7*

Hydroxy-ketones employed in the practice of this invention need not be used in the form of their acetates or other hydroxyl-protected derivatives. This is illustrated by the following example.

A solution of 2.4 g. of allo-pregnanol-3-($\beta$)-one-20 in 400 cc. of glacial acetic acid is mixed with 80 grams of von Baeyer's dry persulfate mixture. It is allowed to stand with occasional shaking for 7 days at 25° C. At the end of this time an additional 40 grams of persulfate mixture is added and the mixture is again allowed to stand for 3 more days. At the end of this time an excess of 50% potassium hydroxide solution is added to neutralize the inorganic salts formed and these, which precipitate, are filtered off and the filtrate concentrated in vacuo. The residue is diluted with water and extracted well with ether. The ethereal layer is washed with water, evaporated to dryness on a steam bath and the residue treated with Girard's reagent in the known manner to remove ketonic substances. The non-ketonic fraction which is somewhat impure androstanediol-diacetate is hydrolyzed by boiling it with alcoholic potassium hydroxide solution for about a half hour. The mixture is diluted with water and extracted with ether and the ethereal layer evaporated to dryness. The residue is sublimed in a high vacuum and the distillate crystallized from dilute acetone and dilute methanol to give dihydro-isoandrosterone, that is, androstanediol-3-($\beta$)-17-($\alpha$), of melting point 162–164° C. When treated with acetic anhydride in the known manner this diol forms a diacetate which is crystallized from ethyl acetate and dilute alcohol to give the diacetate of dihydro-isoandrosterone of melting point 124–126° C. On oxidation with chromic anhydride the diol gives androstanedione, melting point 128–131° C.

The ketonic fraction obtained in the above separation with Girard's reagent is hydrolyzed by allowing it to stand for three hours in dilute hydrochloric acid and then the ketonic substances are extracted with ether. The ether is washed with water, the ether removed in the steam bath, and the residue crystallized from a small amount of methanol. These crystals are dissolved in benzene, the solution passed through a 2 inch column of alumina and the column eluted with ether-benzene and finally with ether. The eluates are worked up separately and yield after crystallization from methanol the diacetate of allo-pregnanediol-3-($\beta$)-21-one-20, of melting point 151–152°.

This ketol is readily isomerized to the corresponding etio acid on treatment with alkali. A sample of about 300 mg. of the above diacetate is refluxed for 1 hour with 50 cc. of 5% alcoholic potassium hydroxide. Then the solution is evaporated to 10 cc. and diluted with water. The mixture is extracted well with ether and the alkaline layer drawn off and acidified and extracted with ether. This ethereal solution is evaporated to dryness and the residue crystallized from dilute methanol and dilute acetone to give 3-($\beta$)-hydroxy-etio-allo-cholanic acid, melting point 248–251°, identical with an authentic example.

*Example 8*

To a solution of 10 g. of progesterone in 200 cc. of ethyl alcohol 10 cc. of perhydrol is added with cooling. Then 20 cc. of sulfuric acid is added and the solution allowed to stand for five days at 25° C. At the end of this time the solution is diluted with about four volumes of water, the mixture made neutral with strong alkali, and extracted with ether. The ethereal layer is washed with water and evaporated to dryness to leave a residue which is a mixture of progesterone, testosterone and desoxycorticosterone. This mixture may be separated by the methods described in Example 6, to give testosterone, 21-hydroxyprogesterone, and some unreacted progesterone.

*Example 9*

A mixture of 4 g. of uranetriol-3-($\alpha$)-11, 20, 15 cc. of acetic acid, and 1 cc. of acetic anhydride is heated in an oil bath at 130° for half an hour. Then the mixture is cooled and a solution of 0.8 g. of chromic anhydride in 10 cc. of 90% acetic acid is added slowly at room temperature. After the mixture has stood for fifteen minutes, about 1 g. of zinc dust is added to destroy the excess chromic anhydride and the mixture is warmed for a few minutes on the steam bath. Then the mixture is decanted from the unreacted zinc and poured into about a liter of cold water. The precipitated gum is collected with ether and the ethereal solution washed with water and sodium carbonate solution. The other is evaporated and the residue is hydrolyzed in the usual manner with 5% methanolic potassium hydroxide. The fraction obtained by ether extraction in the usual manner is separated by means of Girard's reagent and by means of phthalic anhydride in pyridine to give a crude hydroxy ketone fraction of which the main constituent is uranediol-3-(α)-11-one-20, having the formula:

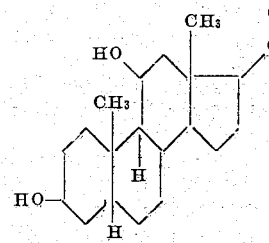

This crude syrup is dissolved in 100 cc. of acetic acid and 20 g. of von Baeyer's persulfate reagent added. The mixture is allowed to stand at room temperature for 8 days with occasional shaking. At the end of this time the mixture is diluted with water, extracted with ether and the ethereal layer washed with water and dilute sodium carbonate solution. The ether is evaporated and the residual syrup is refluxed for an hour with about 50 cc. of methanol containing about 1 g. of potassium bicarbonate. After cooling, the solution is diluted with water and extracted with ether. The ethereal extract is washed with water and then evaporated to dryness to leave a syrup which consists of a mixture of 9-(β)-etio-cholanetriol-3-(α)-11, 17 and uranetriol-3-(α)-11,21-one-20. The prefix 9-(β) here means that the substance belongs to the urane series, i. e. the H-atom at C—9 is inverted, and of the β type. The substances may be represented by the formulae

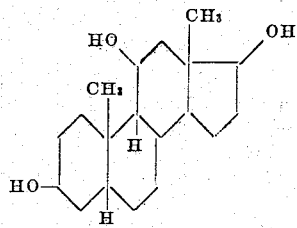

and

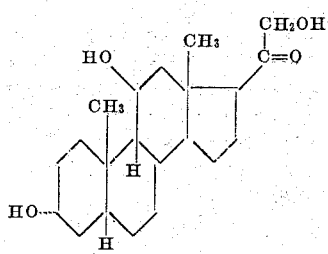

respectively.

This mixture may be separated according to the methods described in the earlier examples.

It will be apparent, in view of the above examples, that my invention is capable of numerous variations in regard to reagents, starting materials, temperatures, reaction conditions and the like, all of which variations fall within the scope of my invention.

The terms "pregnane-compound" and "androstane-compound" as used herein refer to derivatives of the hydrocarbons $C_{21}H_{36}$,

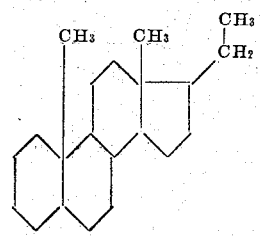

and $C_{19}H_{32}$,

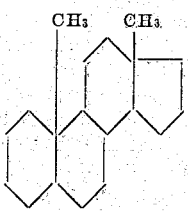

respectively, without regard to a particular configuration at any carbon atom. Thus, the term "pregnane compounds" includes: (a) compounds of the "regular" series, wherein the H atom at C—5 is assumed to be cis to the angular methyl group at C—10; (b) compounds of the "allo" series, wherein the H atom at C—5 is assumed to be trans to the angular methyl group at C—10; (c) compounds of the "urane" series, wherein the H atom at C—9 is assumed to be inverted [Marker et al., J. Am. Chem. Soc., 60, 1061 (1938)]; (d) compounds of the "iso" series, wherein the H atom at C—17 is inverted [Organic Chemistry (ed. H. Gilman) vol. 2, p. 1370 (Wiley, 1938)]. Likewise, the term "androstane compounds" includes derivatives of both etio-cholane and etio-allo-cholane, as well as of other isomers due to inversion at other asymmetric centers in the cyclopentanopolyhydrophenanthrene ring system.

As already indicated, the 20-keto-pregnane compounds on which this invention may be practiced include cyclopentanopolyhydrophenanthrenes having an acetyl $$(CH_3\overset{O}{\overset{\|}{C}}-)$$

group attached to C—17, and, if desired, containing, in any of the rings A, B and C, substituents of the class consisting of hydroxyl groups, groups hydrolyzable to give hydroxyl, double bonds, and keto-groups. Isolated double bonds or isolated ketone groups are preferably intermediately protected, in the former case by addition of halogen or halogen halide, in the latter case by introducing a substituent on the carbon atom adjacent to the ketone group. For most purposes this is best effected by halogenating, preferably chlorinating or brominating, the ketonic steroid. As already indicated, α-β-unsaturated ketones require no protection.

Per-compounds suitable for the practice of this invention are derivatives of hydrogen peroxide. I prefer to use Caro's acid ($H_2SO_5$), ammonium persulfate [$(NH_4)_2S_2O_8$], potassium persulfate, or hydrogen peroxide, but other per-compounds such as per-acetic acid, benzoyl peroxide, sodium per-borate, or sodium per-carbonate, may be used. The per-compound may be prepared and used in statu nascendi by electrolytic methods, employing anodic oxidation of a sulfuric acid-acetic acid solution of the 20-keto-pregnane compound. In all cases, however, I find it best to conduct the oxidation under acidic conditions, preferably in the presence of a non-reducing mineral acid like sulfuric or phosphoric acid. As solvents I use acetic acid, water, alcohol, ethyl acetate, benzene, petroleum ether, or in general, like solvents not having reactive carbon-carbon double bonds or amino, ketonic, or aldehydic groups. Thus I avoid the use of aniline or acetone since these are attacked under the conditions of oxidation. Furthermore, I may vary conditions of temperature and duration of reaction, but in general I employ ordinary temperatures, from 0° C. to about 150° C. and adjust the reaction-time accordingly. I prefer to operate at about room temperature (15-35° C.) and allow the oxidation to proceed for a number of days, as from one to fifteen days, with perhaps occasional addition of more of the per-compound. Longer times are not injurious, but offer no particular advantage, since at the end of one or two weeks the reaction is substantially complete. The conditions of reaction often influence the proportion of products formed, the preferred conditions already described giving largest amounts of the valuable 17-(α)-hydroxy-androstane compounds. As Examples 1 and 2 show, a mixture of 17-epimeric androstane derivatives is more apt to be formed at higher temperatures. Likewise, the effect of light, such as sunlight, is often important, and sometimes best results are obtained by conducting the oxidation in the dark. Other times, a moderate amount of light is beneficial. In all cases, the optimum conditions are readily determined by a few trials.

When organic acids, such as acetic or propionic acids, are used as solvents, the 17-hydroxy androstane derivatives and 21-hydroxy-20-keto-pregnane derivatives are usually obtained in the form of their esters, e. g. the acetates or propionates respectively, and to obtain the parent hydroxy compounds it is necessary to subject the esterified steroids to a saponification procedure. If it is desired to obtain the unesterified 21-hydroxy-20-keto-pregnane derivatives (and 17-hydroxyandrostane derivatives) this saponification must be done under mild conditions, as for example, by boiling for a short time with alkali bicarbonate solution. Often, however, it is preferred to isolate only the unesterified 17-hydroxy-androstane derivatives, and in this case the mixture after hydrolysis may be boiled for a short time with weak alkali hydroxide solution. This treatment does not affect nuclear α,β-unsaturated ketone groups, but transforms 21-hydroxy-20-keto-pregnane derivatives into the corresponding etio-acids.

The separation of the mixture obtained after oxidation may thus be achieved by hydrolysis in combination with partition between solvents, or by other methods, such as those illustrated in the examples. I have found the use of chromatographic adsorption to be particularly advantageous in many instances.

What I claim as my invention is:

1. The process of preparing hydroxy-steroid derivatives which comprises oxidizing the $C_{17}$ substituent,

of a 20-keto-pregnane compound under acidic conditions with a true per-compound which is a derivative of hydrogen peroxide.

2. The process of preparing hydroxy-steroid derivatives which comprises oxidizing a 20-keto-pregnane compound under acidic conditions with a reagent selected from the group consisting of persulfuric acids and their salts to obtain 20-keto-21-hydroxy-pregnane derivatives and 17-hydroxy-androstane derivatives.

3. The process of preparing hydroxy-steroid derivatives which comprises oxidizing a 20-keto-pregnane compound under acidic conditions with a reagent selected from the group consisting of persulfuric acids and their salts to obtain 20-keto-21-hydroxy-pregnane derivatives and 17-hydroxy-androstane derivatives, and separating the products.

4. The process of preparing hydroxy-steroid derivatives which comprises oxidizing a 20-keto-pregnane compound having a nuclear α-halo-ketone grouping, under acidic conditions with a true per-compound which is a derivative of hydrogen peroxide to obtain 20-keto-21-hydroxy-pregnane derivatives having a nuclear α-halo-ketone grouping, and 17-hydroxy-androstane derivatives having a nuclear α-halo-ketone grouping.

5. The process of preparing hydroxy-steroid derivatives which comprises oxidizing a 20-keto-pregnane compound having a nuclear α-halo-ketone grouping under acidic conditions with a true per-compound which is a derivative of hydrogen peroxide to obtain 20-keto-21-hydroxy-pregnane derivatives having a nuclear α-halo-ketone grouping, and 17-hydroxy-androstane derivatives having a nuclear α-halo-ketone grouping, and separating the products.

6. The process of preparing hydroxy-steroid derivatives which comprises protecting the double bond of a 20-keto-pregnane compound having an isolated nuclear double bond by treating said ring-unsaturated 20-keto-pregnane compound with a reagent selected from the class consisting of halogens and hydrohalic acids, and oxidizing the resulting halogenated 20-keto-pregnane compound under acidic conditions with a true per-compound which is a derivative of hydrogen peroxide to obtain halogenated 20-keto-21-hydroxy-pregnane derivatives and halogenated 17-hydroxy-androstane derivatives.

7. The process of preparing hydroxy-steroid derivatives which comprises oxidizing a 20-keto-pregnane compound, bearing in the rings A, B, C substituents selected from the class consisting of hydroxyl and groups hydrolyzable to hydroxyl, under acidic conditions, with a true per-compound which is a derivative of hydrogen peroxide to obtain the corresponding 20-keto-21-hydroxy-pregnane derivatives and 17-hydroxy-androstane derivatives.

8. The process of preparing hydroxy-steroid derivatives which comprises oxidizing under acidic conditions with a reagent selected from the group consisting of persulfuric acids and their salts a 20-keto-pregnane compound of the formula

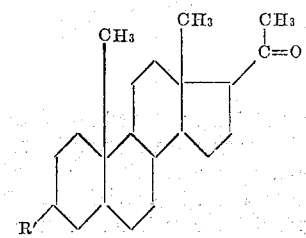

where R' is a radical selected from the class consisting of hydroxyl and groups hydrolyzable to hydroxyl, to obtain compounds of the formulae

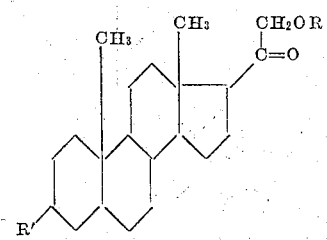

and

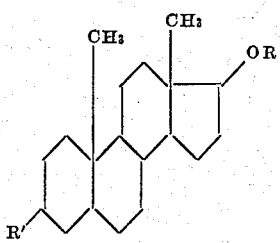

where R is a radical selected from the group consisting of hydrogen and organic and inorganic acid radicals.

9. The process of preparing hydroxy-steroid derivatives which comprises oxidizing under acidic conditions, with a reagent selected from the group consisting of persulfuric acids and their salts, a 20-keto-pregnane compound of the formula

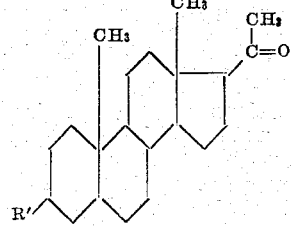

where R' is a radical selected from the class consisting of hydroxyl and groups hydrolyzable to hydroxyl, to obtain compounds of the formulae

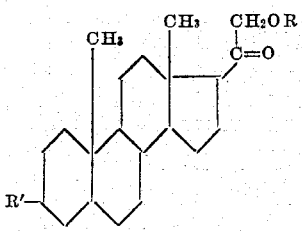

and

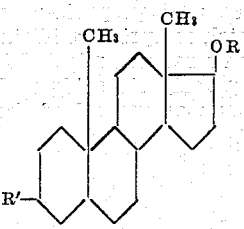

where R is a radical selected from the group consisting of hydrogen and organic and inorganic acid radicals, and separating the products.

10. The process of preparing hydroxy-steroid derivatives which comprises oxidizing under acidic conditions with a reagent selected from the group consisting of persulfuric acids and their salts a 20-keto-pregnane compound of the formula

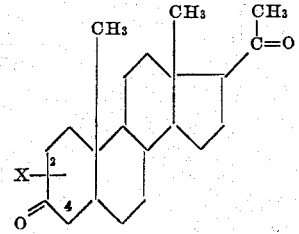

where X is a halogen attached to one of the carbon atoms numbered 2 and 4, to obtain a mixture comprising compounds of the formulae

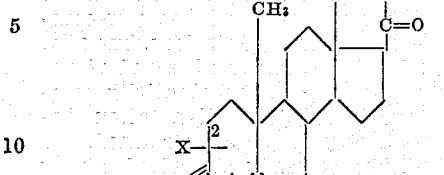

and

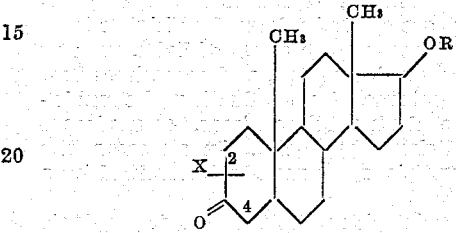

where R is a radical selected from the group consisting of hydrogen and organic and inorganic acid radicals.

11. The process of preparing hydroxy-steroid derivatives which comprises oxidizing under acidic conditions with a reagent selected from the group consisting of persulfuric acids and their salts a 20-keto-pregnane compound of the formula

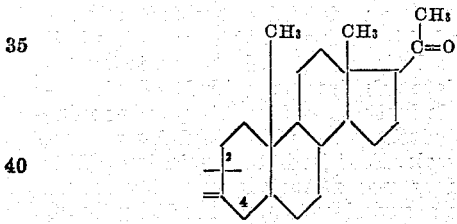

where X is a halogen attached to one of the carbon atoms numbered 2 and 4, to obtain a mixture comprising compounds of the formulae

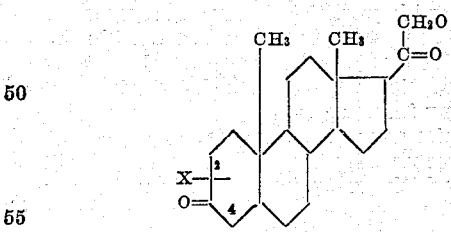

and

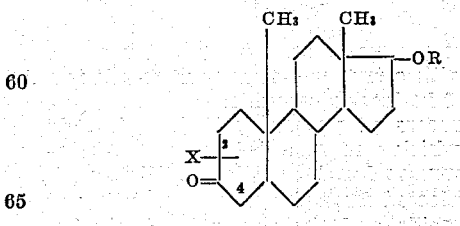

where R is a radical selected from the group consisting of hydrogen and organic and inorganic acid radicals, heating said mixture with a reagent capable of removing hydrohalic acid, and separating the products.

12. The process of preparing hydroxy-steroid derivatives which comprises oxidizing 4-bromo-pregnanedione-3,20 under acidic conditions with a reagent selected from the group consisting of persulfuric acids and their salts to obtain a mixture comprising compounds of the formulae

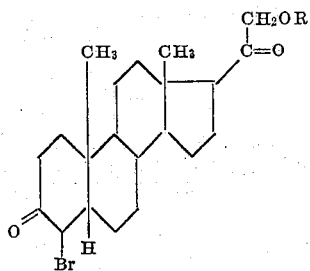

and

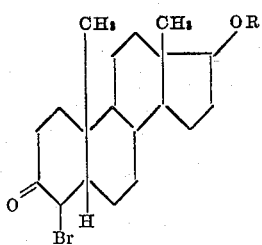

where R is a radical selected from the group consisting of hydrogen and organic and inorganic acid radicals, heating said mixture with a tertiary organic base, and separating the products.

13. The step which comprises oxidizing a steroid, having an acetyl

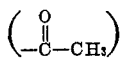

group attached to C—17 of the cyclopentanopolyhydrophenanthrene nucleus, under acidic conditions with a reagent selected from the group consisting of persulfuric acids and their salts.

14. The step which comprises oxdizing a steroid, having an acetyl

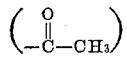

group attached to C—17 of the cyclopentanopolyhydrophenanthrene nucleus, under acidic conditions with a reagent selected from the group consisting of persulfuric acids and their salts, in acetic acid solution, for 1–15 days at 15–35° C.

15. The process of preparing hydroxysteroid derivatives which comprises protecting the double bond of a 20-keto-pregnane compound of the formula.

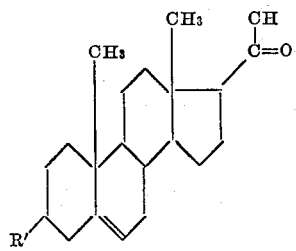

where R' is a radical selected from the class consisting of hydroxyl and groups hydrolyzable to hydroxyl by treating said 20-keto-pregnane compound with a reagent selected from the class consisting of halogens and hydrohalic acids, and oxidizing the resulting halogenated 20-ketopregnane compound under acidic conditions with a reagent selected from the class consisting of persulfuric acids and their salts to obtain compounds of the formulae

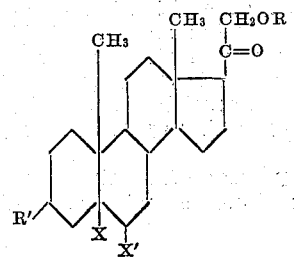

and

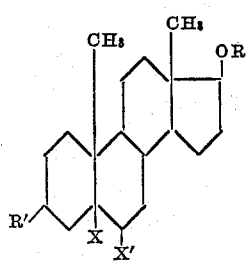

where R is a radical selected from the group consisting of hydrogen and organic and inorganic acid radicals where X is halogen and where X' is selected from the group consisting of halogen and hydrogen.

16. The process of preparing hydroxysteroid derivatives which comprises protecting the double bond of a 20-keto-pregnane compound of the formula where R' is a radical selected from the class consisting of hydroxyl and groups hydrolyzable to hydroxyl by treating said 20-keto-pregnane compound with a reagent selected from the class consisting of halogens and hydrohalic acids, oxidizing the resulting halogenated 20-keto-pregnane compound under acidic conditions with a reagent selected from the class consisting of persulfuric acids and their salts to obtain compounds of the formulae and where R is a radical selected from the group consisting of hydrogen and organic and inorganic acid radicals, where X is halogen and where X' is selected from the group consisting of halogen and hydrogen, removing the protecting atoms X and X' by treatment with an agent selected from the class consisting of dehalogenating and dehydrohalogenating agents, and separating the products.

17. The process of obtaining a 17-hydroxy-androstane from a mixture containing 21-hydroxy-20-keto-pregnane derivatives and 17-hydroxy-androstane derivatives, which comprises heating the mixture with alkali under conditions sufficiently mild to leave nuclear $\alpha, \beta$-unsaturated ketone groups practically unaffected with production of the water-insoluble, organic solvent-soluble 17-hydroxy-androstane compound and the water-soluble, organic solvent-insoluble alkali metal salt of the etio-cholanic acid compound, and separating this mixture.

RUSSELL EARL MARKER.